(12) United States Patent
Sato et al.

(10) Patent No.: US 6,560,185 B2
(45) Date of Patent: May 6, 2003

(54) DISK DEVICE

(75) Inventors: Masao Sato, Tokyo (JP); Atsushi Michimori, Tokyo (JP); Takeshi Inatani, Tokyo (JP); Masaaki Takeshima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 122 days.

(21) Appl. No.: 09/750,792

(22) Filed: Jan. 2, 2001

(65) Prior Publication Data

US 2001/0002185 A1 May 31, 2001

Related U.S. Application Data

(63) Continuation of application No. PCT/JP99/02531, filed on May 14, 1999.

(51) Int. Cl.[7] ............................................... G11B 33/02
(52) U.S. Cl. ..................................................... 369/77.1
(58) Field of Search ............................... 369/75.2, 77.1, 369/77.2

(56) References Cited

FOREIGN PATENT DOCUMENTS

| JP | 7-182831 | 3/1995 |
|----|----------|--------|
| JP | 7-220355 | 8/1995 |
| JP | 9-231654 | 9/1997 |

*Primary Examiner*—George J. Letscher
(74) *Attorney, Agent, or Firm*—Birch, Stewart, Kolasch & Birch, LLP

(57) ABSTRACT

An MD 107 is feed to a fixed position in a device by a case-stored recording medium disk loading mechanism having a slit mechanism 125, an MD holder feeding arm 108 and the like. The disk 107 is loaded onto a turntable 131. A drive plate 101 is provided which is driven in a coupled manner and refuges a non case-stored recording medium disk loading mechanism, which has a CD clamp 104 and a CD adapter 106, to a position which does not interfere with the loading of the MD 107 onto the turntable 131.

6 Claims, 21 Drawing Sheets

FIG.15
FIG.16
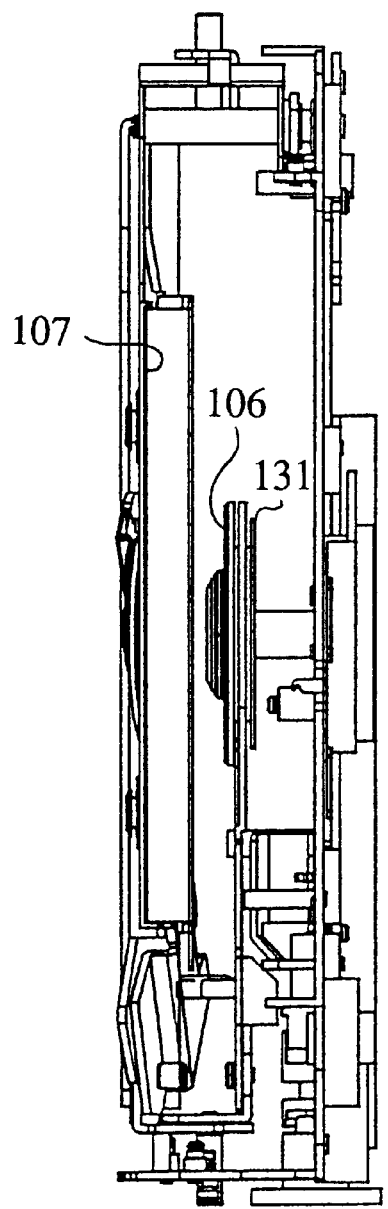
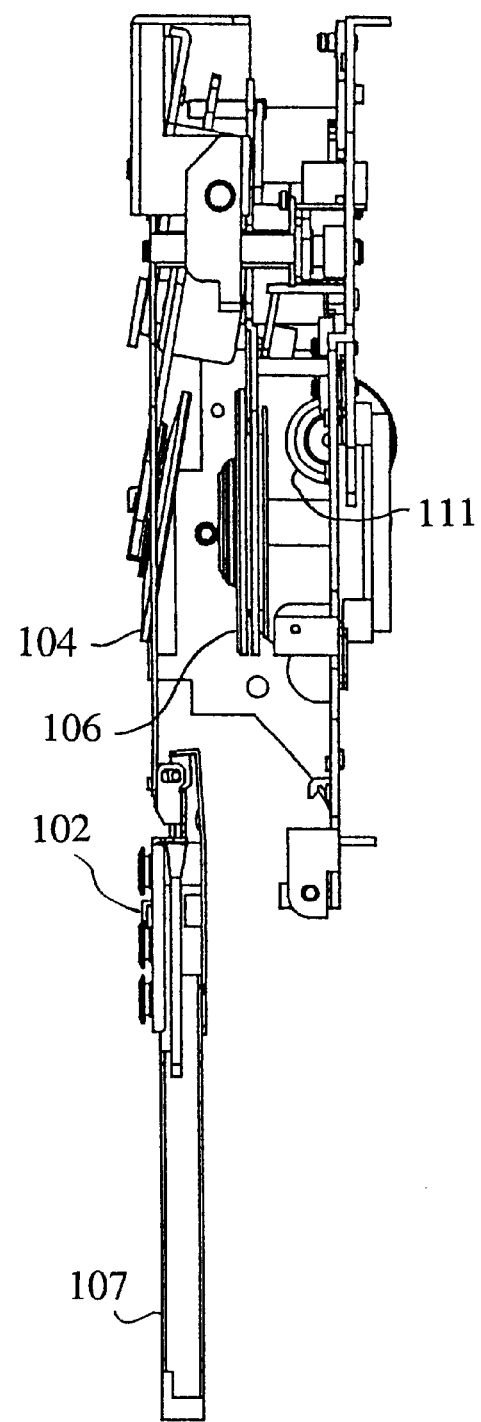

DISK DEVICE

CROSS-REFERENCE TO THE RELATED APPLICATION

This application is a continuation of international Application No. PCT/JP99/02531, whose international filing date is May 14, 1999, the disclosures of which Application are incorporated by reference herein.

BACKGROUND OF THE INVENTION

1. Field of the Invention

The present invention relates to a disk device which performs loading and ejection operations at different times onto and from a turntable of information recording media of different sizes such as a CD (compact disk) which is used as a single disk or an MD (minidisk) which is used in cartridge-stored form.

2. Description of Related Art

FIG. 1 is a schematic figure of a loading device as disclosed for example in JP-A-9-231654. In the figures, 1 is a CD-MD compatible player, 10 is a chassis assembly, 11 is a chassis, 12 is a spindle motor, 13 is a turntable, 14 is an optical pickup, 15 is a supporting plate, 16 is a pin, 17 is a rack, 20 is an adapter assembly, 21 is a bracket, 22 is a shaft, 23 is a cylinder, 24 is a spring, 25 is a retaining ring, 26 is an arm, 27 is an adapter, 28 is a boss, 29 is a triangular cam, 30 is a gear wheel, 31 is a motor, 40 is a disk holder assembly, 46 is a disk holder, and 61 is an MD guide plate.

The operation of the conventional disk device will be described below.

In the conventional disk device, after the insertion of an MD is detected, a motor 31 which acts as a source of drive power for an adapter 27 is activated. An arm 26 which is integrated with a cylinder 23 is rotated in the anti-clockwise direction shown in the figure about a shaft 22 by the rotations of a gear wheel connected to the motor 31. While the boss 28 which is fixed to the arm 26 is moving to the top of the triangular cam 29, the large radius adapter 27 on the tip of the arm 26 separates from the small radius turntable 13 and the arm 26 rotates further in the anti-clockwise direction. As a result, while the boss 28 fixed to the arm 26 is moving down the inclined face from the top of the triangular cam 29, the large radius adapter 27 provided on the tip of the arm 26 is rotated into the chassis 11 and is automatically refuged to a position which does not interfere with the MD.

As the conventional disk device is structured in such a way, the mechanism of refuging the clamp is not clear. Furthermore the speed of refuging the adapter 27 is fixed irrespective of the speed at which an MD is inserted as the adapter 27 is refuged on detecting the insertion of an MD. Thus, interference between an inserted MD and the refuge operation of the adapter 27 can easily occur which reduces the reliability of the device and increases the complexity of the structure.

The present invention is proposed to solve the above problems and has the object of providing a disk device with improved reliability and simplified structure which can be used with both CDs (compact disks) which are used as a single disk or MDs (minidisks) which are used in cartridge-stored form.

SUMMARY OF THE INVENTION

The disk device of the present invention comprises a coupled displacement member which displaces in a coupled manner, a case-stored recording medium disk loading mechanism which loads case-stored recording medium disks, fed to a fixed position in the disk device by the coupled displacement member, onto a turntable, a non case-stored recording medium disk loading mechanism which loads non case-stored recording medium disks, taken up to a fixed position in the disk device, onto a turntable and which has a non case-stored recording medium disk clamp and a non case-stored recording medium disk adapter, and a refuge mechanism which refuges the non case-stored recording medium disk loading mechanism into the device to a position which does not interfere with the loading of case-stored recording medium disks on the turntable due to the displacement of the coupled displacement member when the case-stored recording medium disk loading mechanism feeds a case-stored recording medium disk to a fixed position in the device by the displacement of said coupled displacement member and loads said disk onto the turntable.

By such an arrangement, the uptake of a case-stored recording medium disk to a fixed position in the disk device by the case-stored recording medium disk loading mechanism and the loading of such a disk onto the turntable as well as the refuging of the non case-stored recording medium disk loading mechanism is realized by the coupled displacement of the coupled displacement member. Thus, improved reliability and a simplified structure is realized for the disk device.

The disk device of the present invention is provided with a cam mechanism which raises the non case-stored recording medium disk adapter upwardly due to the coupled displacement of the coupled displacement mechanism when the case-stored recording medium disk loading mechanism loads onto the turntable a case-stored recording medium disk fed to a fixed position in the device.

By such an arrangement, the upward raising operation of the non case-stored recording medium disk adapter which accompanies the refuge of the non case-stored recording medium disk loading mechanism when a case-stored recording medium disk is fed to a fixed position in the device and loaded onto the turntable can be realized by the coupled displacement of the coupled displacement member and so the reliability of the device can be improved and its structure simplified.

The disk device of the present invention comprises a case-stored recording medium disk feed member which performs a rotating operation due to the coupled displacement of the coupled displacement member and an operation conversion mechanism which changes the rotation operation of the case-stored recording medium disk feed member into the coupled operation of the case-stored recording medium disk holder which houses the case-stored recording medium disk in order to feed in a coupled manner a case-stored recording medium disk to a fixed position in the device.

By such an arrangement, the operation of feeding a case-stored recording medium disk directly to a fixed position in the disk can be realized by the coupled displacement of the coupled displacement member and thus the structure of the device may be simplified and its reliability may be improved.

In the disk device of the present invention, a case-stored recording medium disk insertion member is provided with a disk holder arm, one end of which is engaged to slide with a section of a case-stored recording medium disk holder and which forms a section of the operation conversion mechanism and the other end of which is rotatably supported, and a guide slit which is integrated rotatably with the disk holder arm and which forms a curved guide slit. A coupled displacement member is provided with a pin which is engaged with the guide slit formed on the guide slit member.

By such an arrangement, the coupled feed operation of the case-stored recording medium disk into a fixed position in the device is realized by the coupled displacement of the coupled displacement member and thus the structure of the device may be simplified and its reliability may be improved.

The disk device of the present invention comprises a refuge mechanism provided with a guide slit which is formed in proximity to the base of the disk adapter arm on the end of which a non case-stored recording medium disk adapter is rotatably formed and a pin formed on the coupled displacement member which refuges the non case-stored recording medium disk loading mechanism into the device by the coupled displacement of the coupled displacement member.

By such an arrangement, the refuge of the non case-stored recording medium disk loading mechanism when a case-stored recording medium disk is fed into a fixed position in the device and loaded onto the turntable is realized by the coupled displacement of the coupled displacement member and thus the structure of the device may be simplified and its reliability may be improved.

BRIEF DESCRIPTION OF THE DRAWINGS

FIG. 15 is an explanatory view of an MD being housed in a fixed position in the MD holder in a disk device according to a first embodiment of the present invention.

FIG. 16 is an explanatory view of an MD being housed in a fixed position in the MD holder in a disk device according to a first embodiment of the present invention.

DETAILED DESCRIPTION OF THE PREFERRED EMBODIMENTS

In order to describe the invention in greater detail, the preferred embodiments will be outlined below with reference to the accompanying figures.

Figure 1:
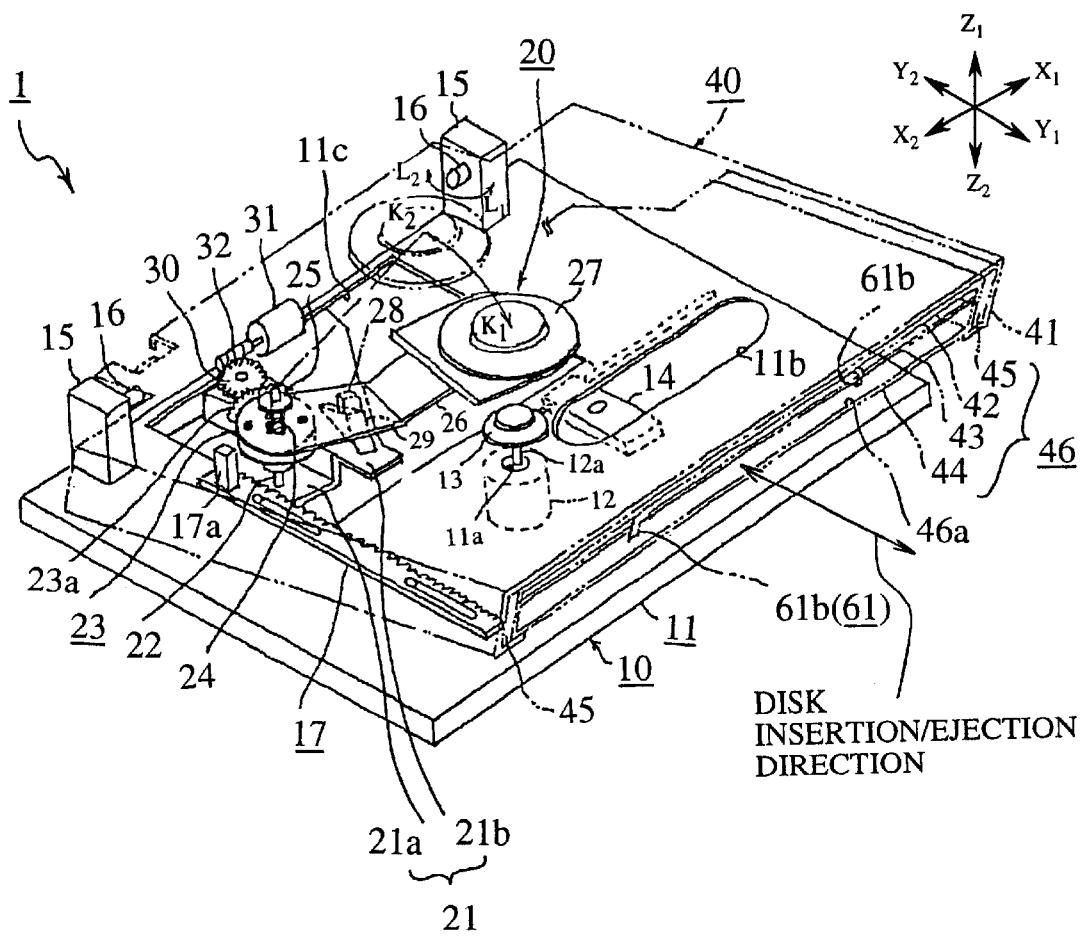
FIG. 1 is a schematic figure of the loading device disclosed in JP-A-9-231654.
Figure 2:
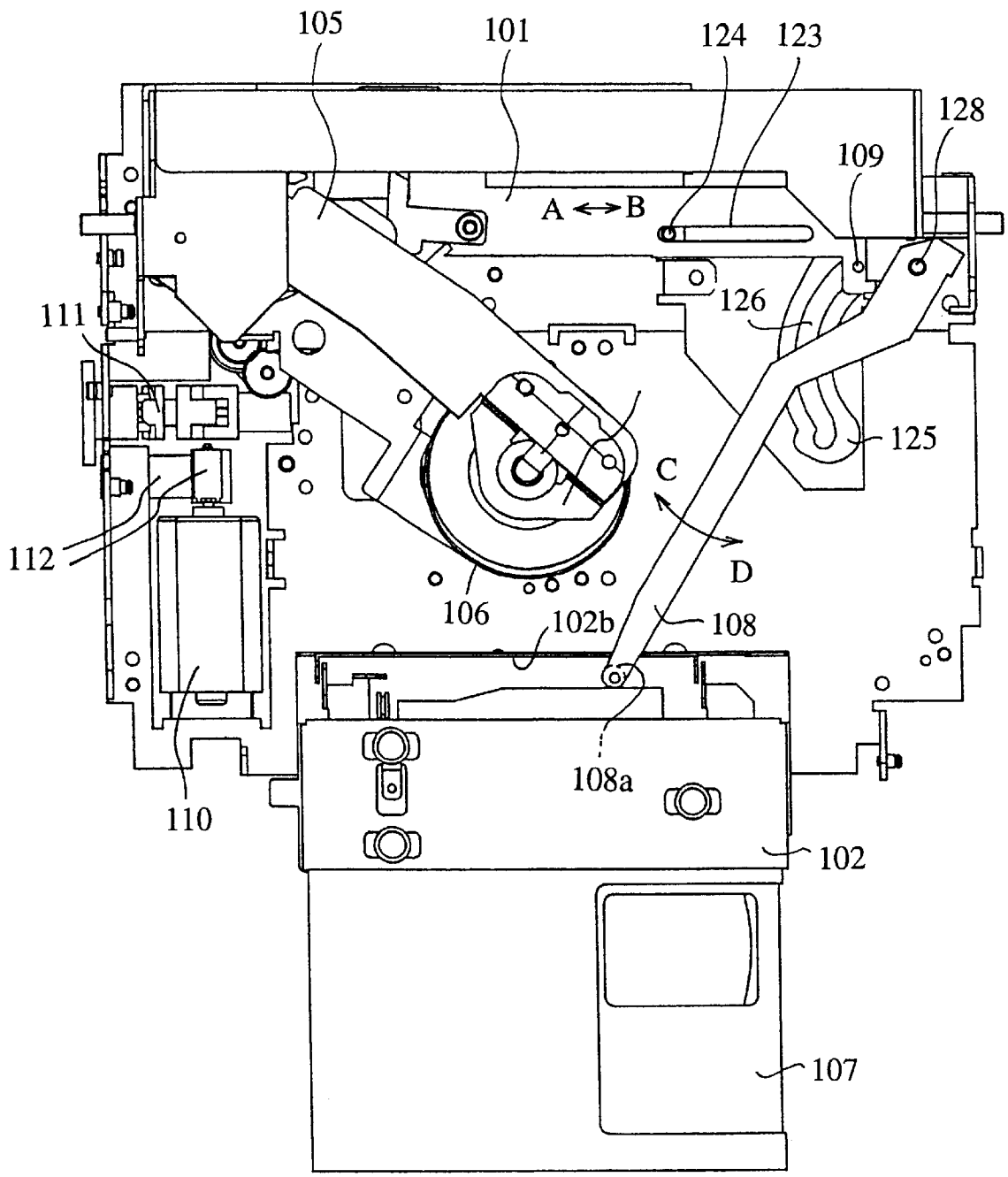
FIG. 2 shows the structure of a disk device according to a first embodiment of the invention.
Figure 3:
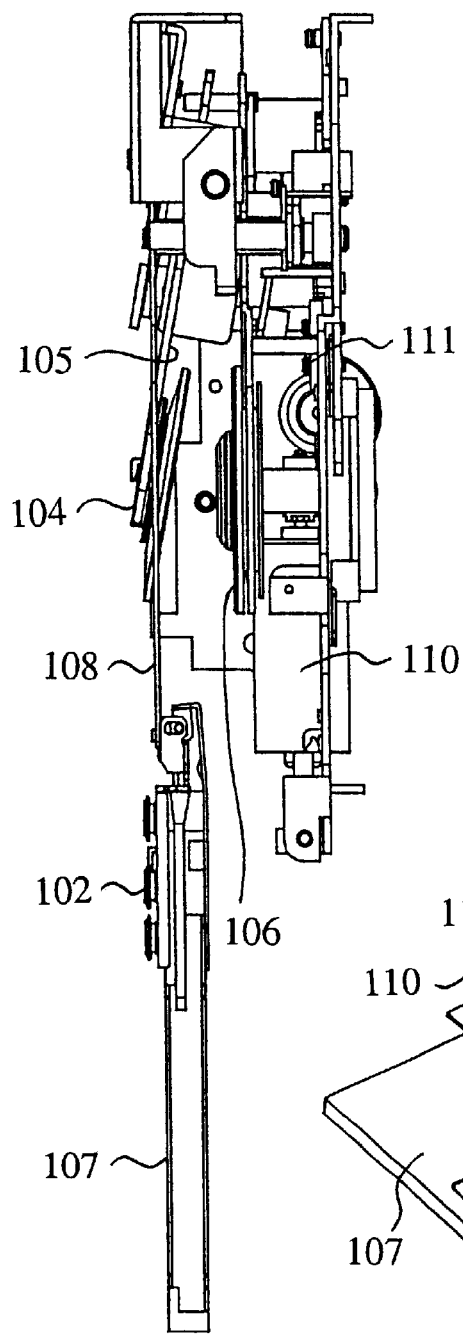
FIG. 3 shows the interior structure of the right side of the disk device shown in FIG. 2 according to a first embodiment of the present invention.
Figure 4:
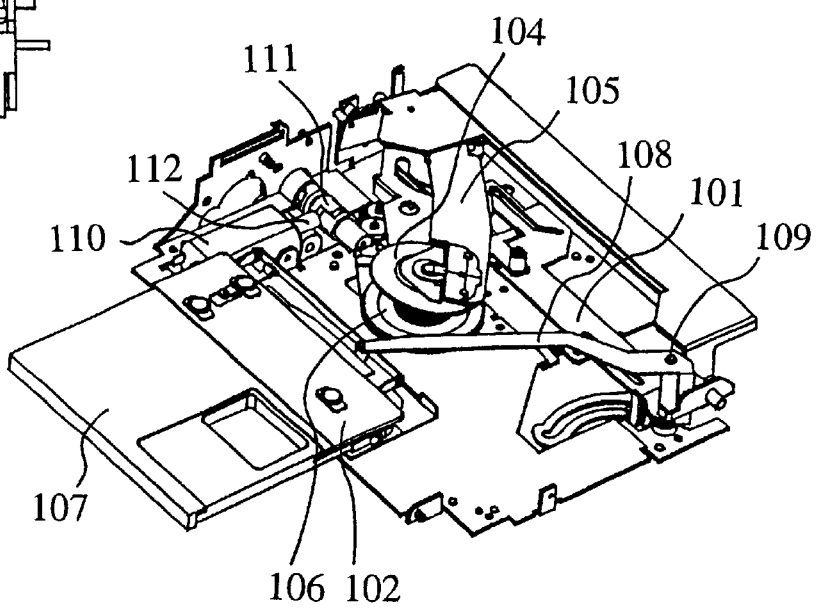
FIG. 4 is a three-dimensional figure of the disk device shown in FIG. 2 and FIG. 3 according to a first embodiment of the present invention.

FIG. 2 shows the structure of a disk device according to a first embodiment of the invention. FIG. 3 shows the interior structure of the right side of the disk device shown in FIG. 2 according to a first embodiment of the present invention. FIG. 4 is a three-dimensional figure of the disk device shown in FIG. 2 and FIG. 3 according to a first embodiment of the present invention. In the figures, 101 is a dive late (coupled displacement member) which refuges a compact disk thereafter CD) adapter and CD clamp and which feeds a minidisk (hereafter MD) holder 102 into the device. When the drive plate 101 displaces in direction A, the CD adapter 106 and CD clamp 104 are refuged and the MD holder 102 is drawn into the device. 104 is a CD clamp (non case-stored recording medium disk loading mechanism), 105 is a CD clamp arm. 106 is a CD adapter (non case-stored recording medium disk loading mechanism). In FIGS. 2, 3 and 4, the CD adapter 106 is disposed at a position mounted on the turntable (not shown). 107 is an MD inserted into the device from the MD holder 102. 108 is an MD holder feed arm (case-stored recording medium disk loading mechanism, case-stored recording medium disk feed mechanism) for feeding the MD holder 102 into the device. The MD holder feed arm 108 is rotatable in direction D and C about the shaft 128. When the MD 107 is in the position shown in FIG. 2 housed in a fixed position in the MD Holder 102, the MD holder feed arm 108 is rotatable in direction C depending on the insertion operation of the MD 107 by a user. A roller 108a for example (operation conversion mechanism) is rotatably supported on the end of the MD holder feed arm 108. The roller 108a displaces the roller engagement face 102b formed on a edge of the MD holder 102 together with the rotation of the MD holder feed arm 108.

110 is a motor acting as a source of drive power for driving the drive plate 101 in directions A and B. 111 is a clutch, 112 is a gear wheel which transmits the drive force of the motor 110 to the clutch 111.

Figure 5:
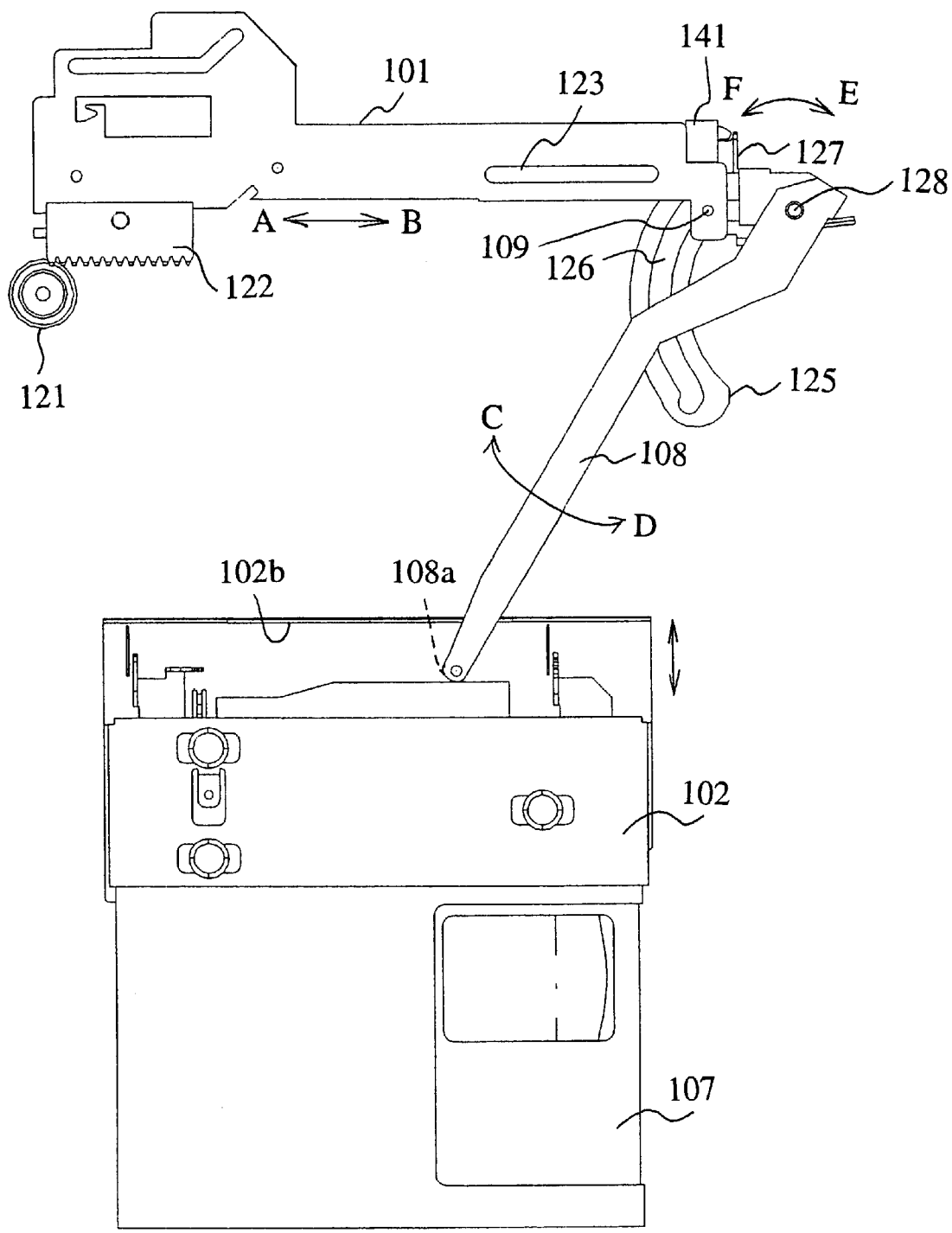
FIG. 5 is a detail showing the engaged relationship of the MD holder insertion arm and the drive plate in a disk device according to a first embodiment of the present invention.

FIG. 5 is a detail showing the engaged relationship of the MD holder insertion arm and the drive plate. In FIG. 5 the same or similar components as those in FIGS. 2, 3 and 4 are designate with the same numerals and will not be described further. In FIG. 5, 121 is a gear wheel for driving the drive plate 101 in directions A and B. The gear wheel 121 is driven by a motor 110. 122 is a rack which is formed on the drive pate 101 and which engages with the drive gear wheel 121. 123 is a guide slit which guides the drive plate 101 which displaces in direction A and direction B. The guide slit 123 as shown in FIG. 2 engages with a pin 124 and the displacement of the drive plate 101 in directions A and B is guided by the pin 124.

125 is a slit member on which a curved slit 126 is formed (case-stored recording medium disk loading mechanism, case-stored recording medium disk feed mechanism). The slit member 125 is rotatably integrated with the MD holder feed arm 108 and rotates about the shaft 128. The slit 126 of the slit member 125 engages with a pin 109 formed on the drive plate 101. 127 is a switch operation piece which is rotatably integrated with the MD holder feed arm 108. The switch 127 rotates in directions E and F about the shaft 128 together with the rotation of the MD holder feed arm 108 in directions C and D. 141 is an MD insertion detection switch for detecting insertion of an MD 107. As shown in FIG. 5, the switch 141 is disposed at a position which abuts with the actuator of the MD insertion detection switch 141 when the MD holder feed arm 108 is in the rotation limiting position in direction D. Thus when the MD 107 housed in the MD holder 102 is pressed only slightly into the device, the MD holder feed arm 108 rotates in direction C and the switch operation piece 127 rotates in direction E. The switch operation piece 127 does not abut with the actuator of the MD insertion detection switch 141. As a result, the MD insertion detection switch 141 is switched and the insertion of an MD 107 can be detected.

Figure 6:
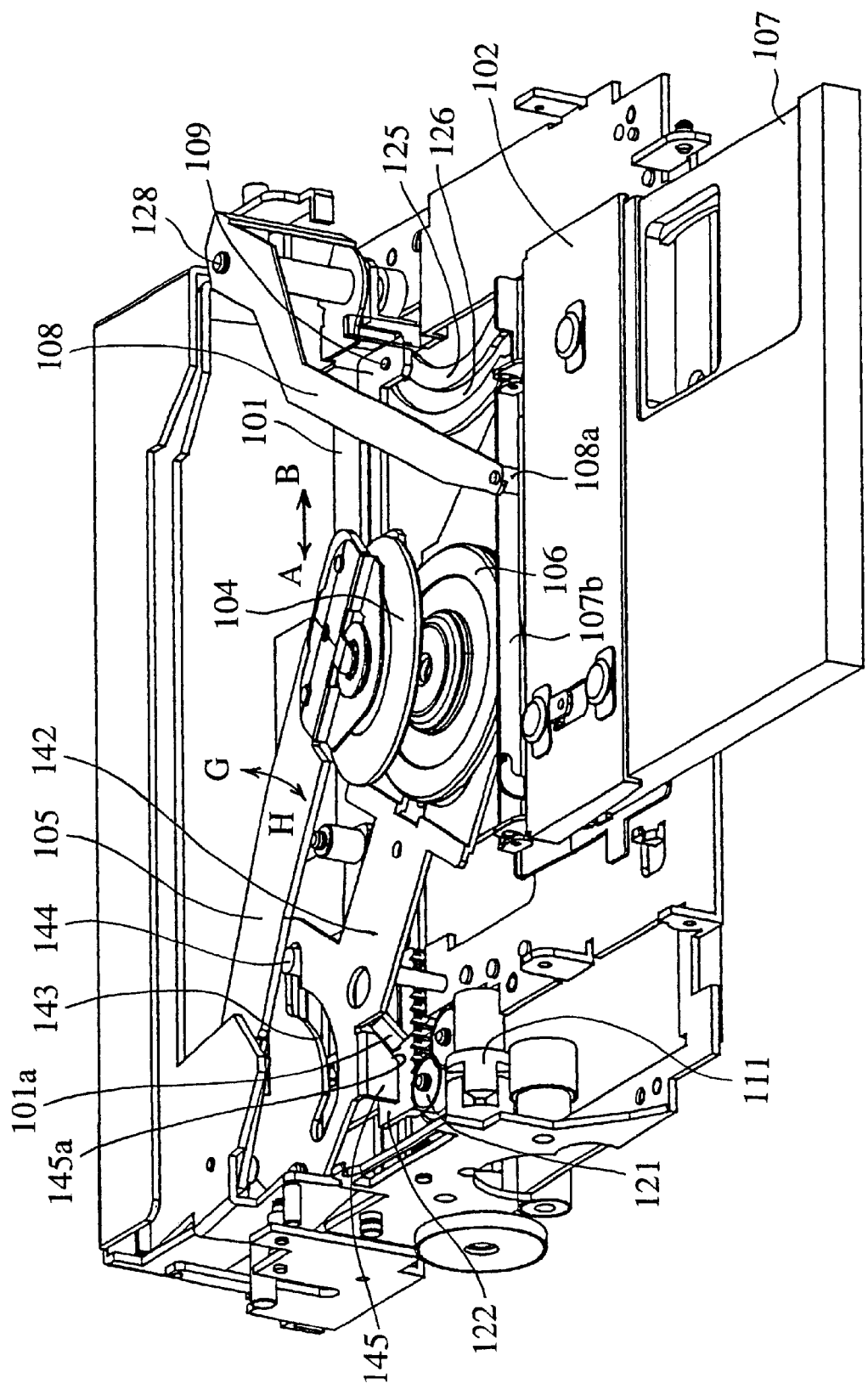
FIG. 6 is a three-dimensional view of the disk device according to a first embodiment of the present invention.
Figure 7:
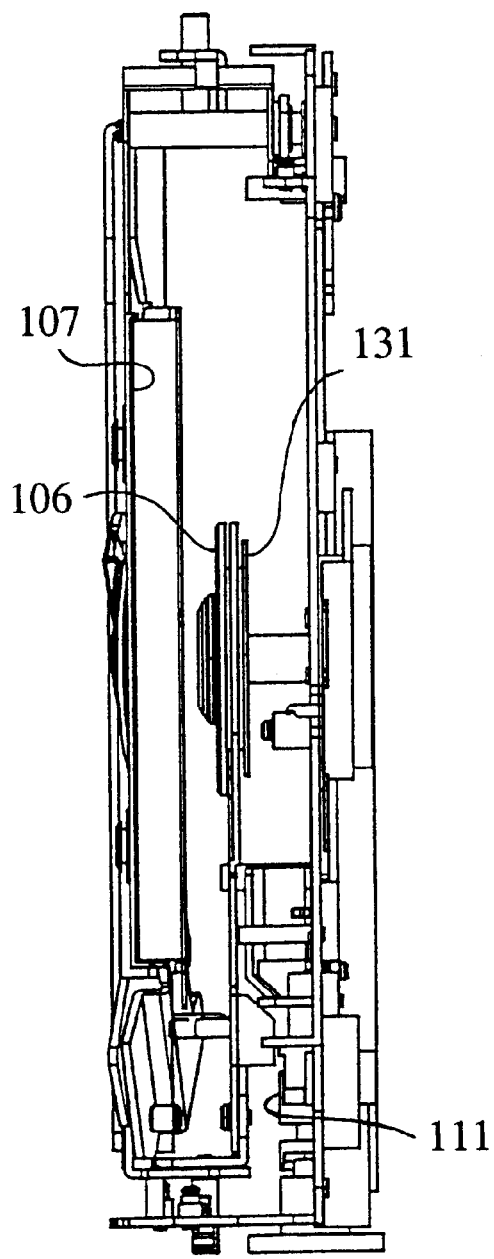
FIG. 7 shows a disk device according to a first embodiment of the present invention in FIG. 6 when seen from the direction of insertion of an MD.
Figure 8:
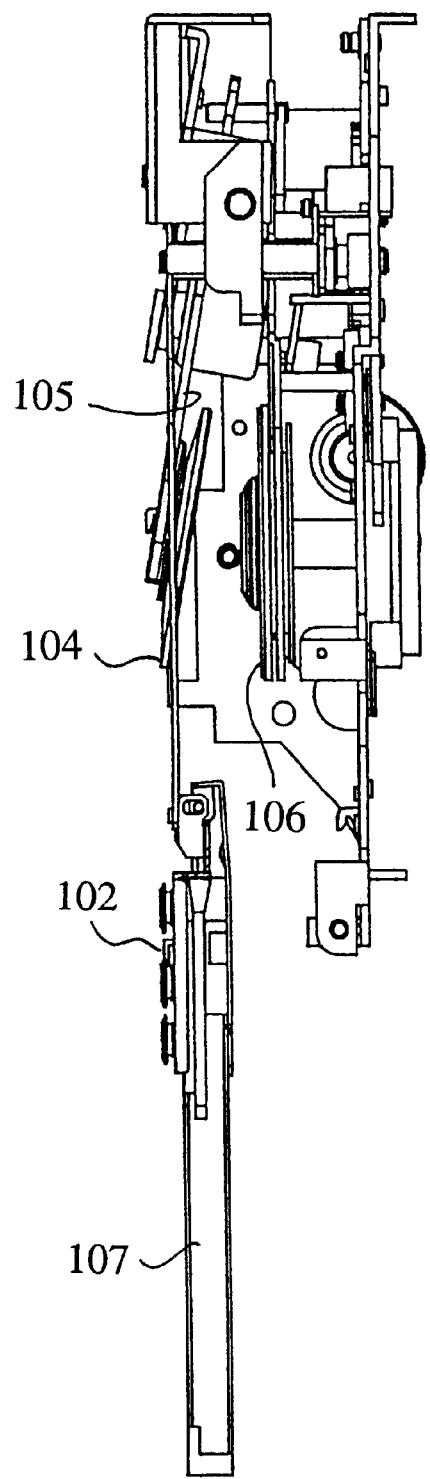
FIG. 8 shows a disk device according to a first embodiment of the present invention in FIG. 6 when seen from the right side.

FIG. 6 is a three-dimensional view of the disk device according to a first embodiment of the present invention. FIG. 7 shows a disk device according to a first embodiment of the present invention in FIG. 6 when seen from the direction of insertion of an MD. FIG. 8 shows a disk device according to a first embodiment of the present invention in FIG. 6 when seen from the right side. In the figures, the same or similar components to those in FIGS. 2, 3 and 4 are designated by the same reference numerals and will not be further described. In FIG. 6, 142 is a CD adapter arm (refuge mechanism) which supports the CD adapter, 143 is the guide slit (refuge mechanism) which is formed on the base of the CD adapter arm 142, and 144 is a pin (refuge mechanism) which is formed on the drive plate 101 and engages with the guide slit 143. The guide slit 143 rotates the CD clamp arm 105 and the CD adapter arm 142 in the direction G of the arrow as the drive plate 101 displaces in direction A and the pin 143 formed on the drive plate 101 displaces into the guide slit 143. In FIG. 7, 131 is a turntable for common use with MDs and CDs.

45 is a projection (cam mechanism) which is formed bent downwards towards the base of the CD adapter arm 142. The projection 145 has an inclined edge 145a. When the drive plate 101 displaces in direction A, the inclined step (cam mechanism) 101a and the edge 145a of the projection 145 formed on the drive plate 101 abut. When the drive plate 101 further displaces in direction A with the edge 145a of the projection 145 and the inclined step 101a in a state of abutment, the edge 145a of the projection 145 displaces to the upper section of the inclined step 101a while sliding on the face of the inclined step 101a. As a result, the CD adapter arm 142 is raised upwards and the CD adapter 106 formed on the tip of the CD adapter arm 142 overlaps with the lower face of the CD clamp 104.

Figure 9:
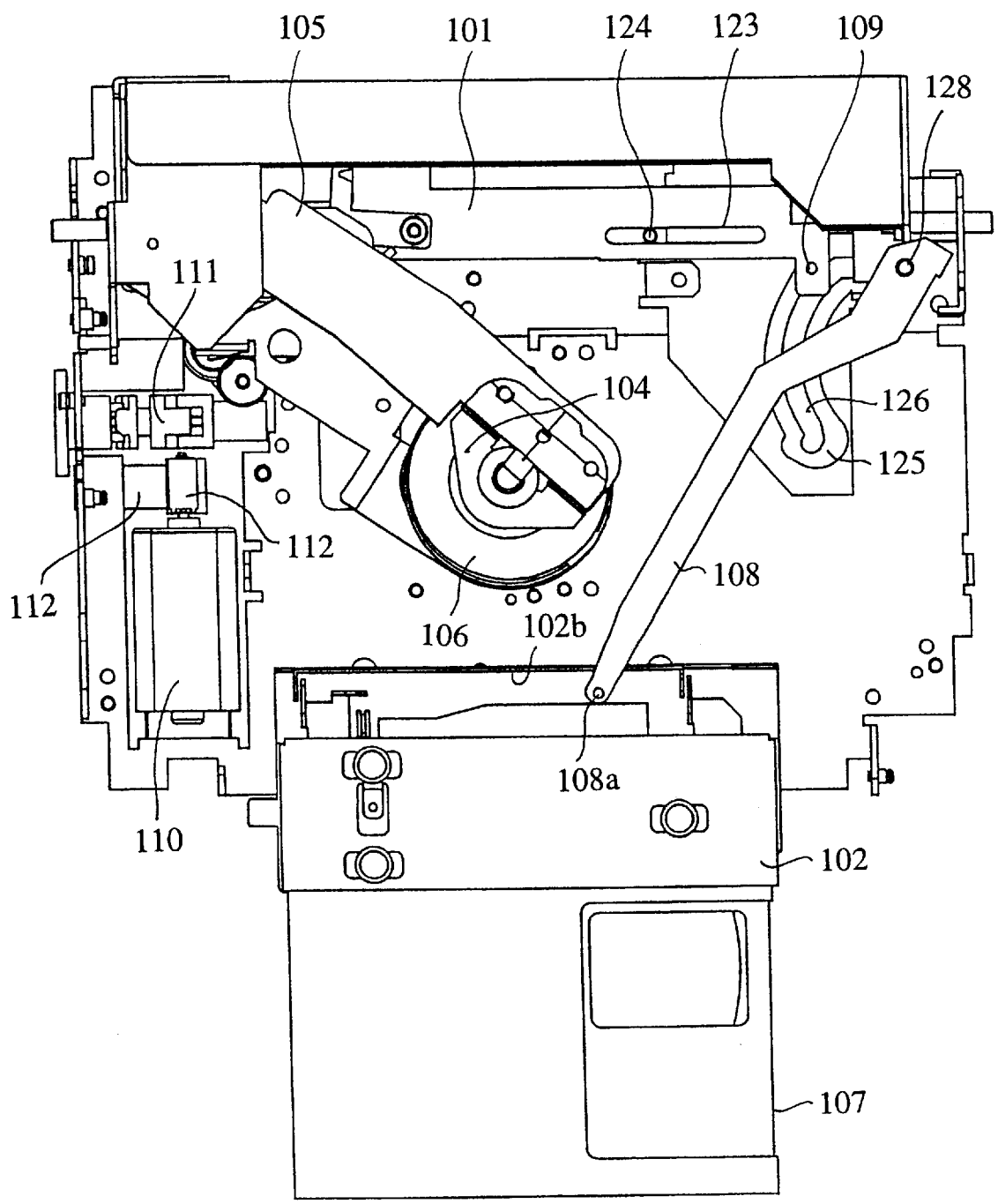
FIG. 9 shows the CD adapter being raised upwardly in a disk device according to a first embodiment of the present invention.
Figure 10:
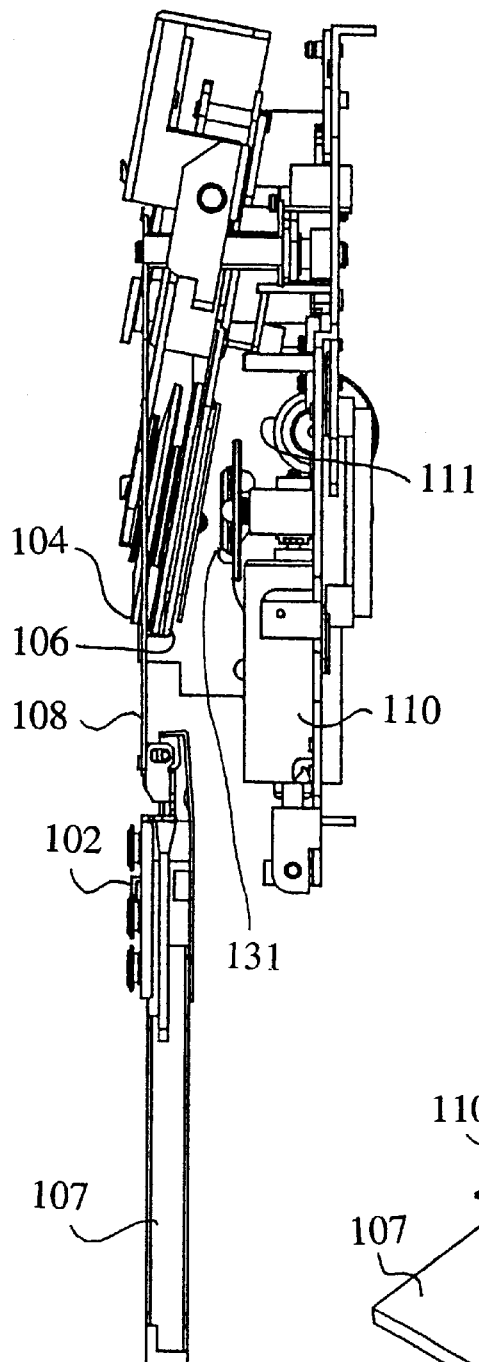
FIG. 10 shows the interior of a disk device in FIG. 6 when seen from the right side.
Figure 11:
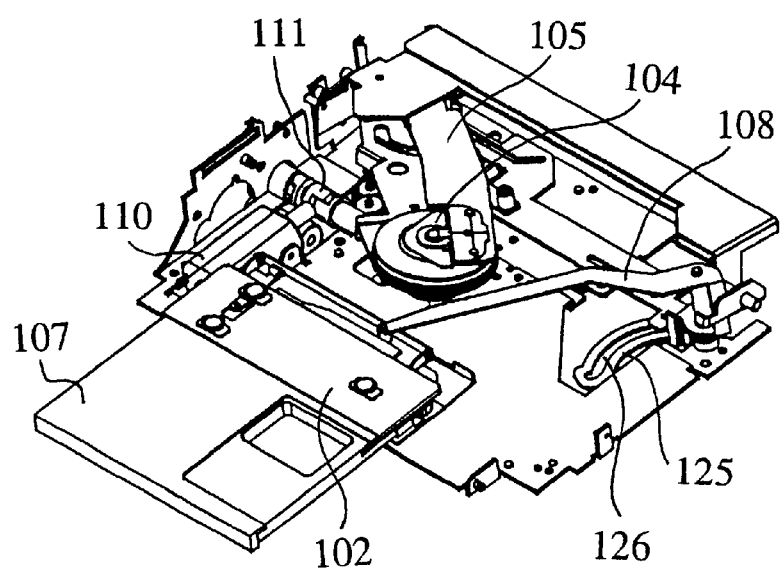
FIG. 11 is a three-dimensional view of the disk device shown in FIG. 9 and FIG. 10 according to a first embodiment of the present invention.

FIG. 9 shows the CD adapter 106 being raised upwardly with an MD 107 inserted in a fixed position in the MD holder 102 in a disk device according to a first embodiment of the present invention. FIG. 10 shows the interior of a disk device in FIG. 6 when seen from the right side. FIG. 11 is a three-dimensional view of the disk device shown in FIG. 9 and FIG. 10 according to a first embodiment of the present invention. In the figures, the same or similar components to those in FIGS. 2, 3 , 4 and 7 are designated by the same reference numerals and will not be further described.

In FIG. 9, the turntable 131 for common use with MDs and CDs is, shown with the CD adapter 106 raised upwardly. The upward displacement of the CD adapter 106 is realized by the displacement of the drive plate 101 in direction A and the CD adapter 106 has a mechanism for that purpose.

Figure 12:
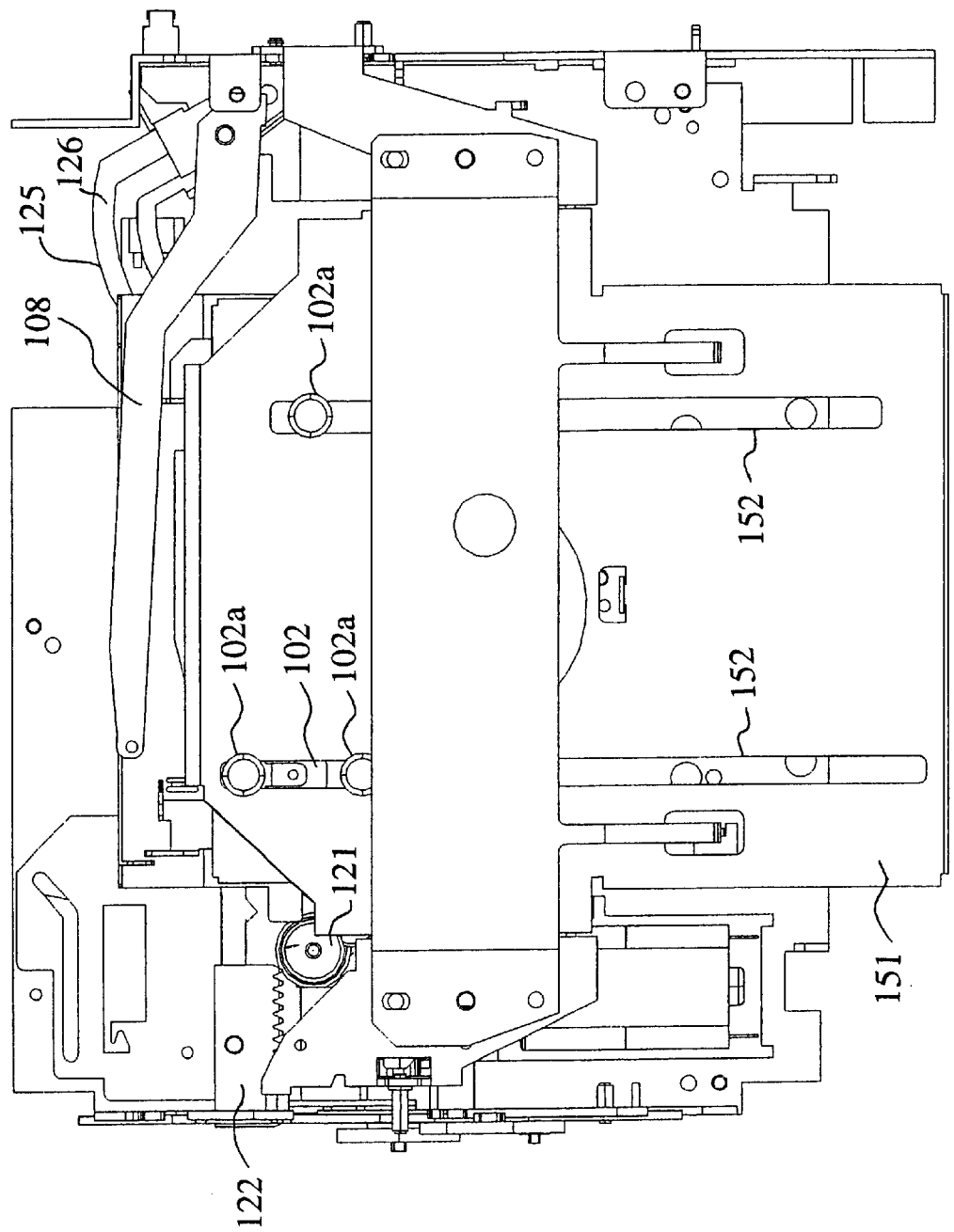
FIG. 12 is a view of a MD holder guide according to a first embodiment of the present invention.

FIG. 12 is a view of a MD holder guide according to a first embodiment of the present invention. In the figure, 151 is an MD holder guide and 152 is a guide slit formed on the MD holder guide 151. The guide slit 152 engages with the pin 102a formed on the MD holder 102.

Figure 13:
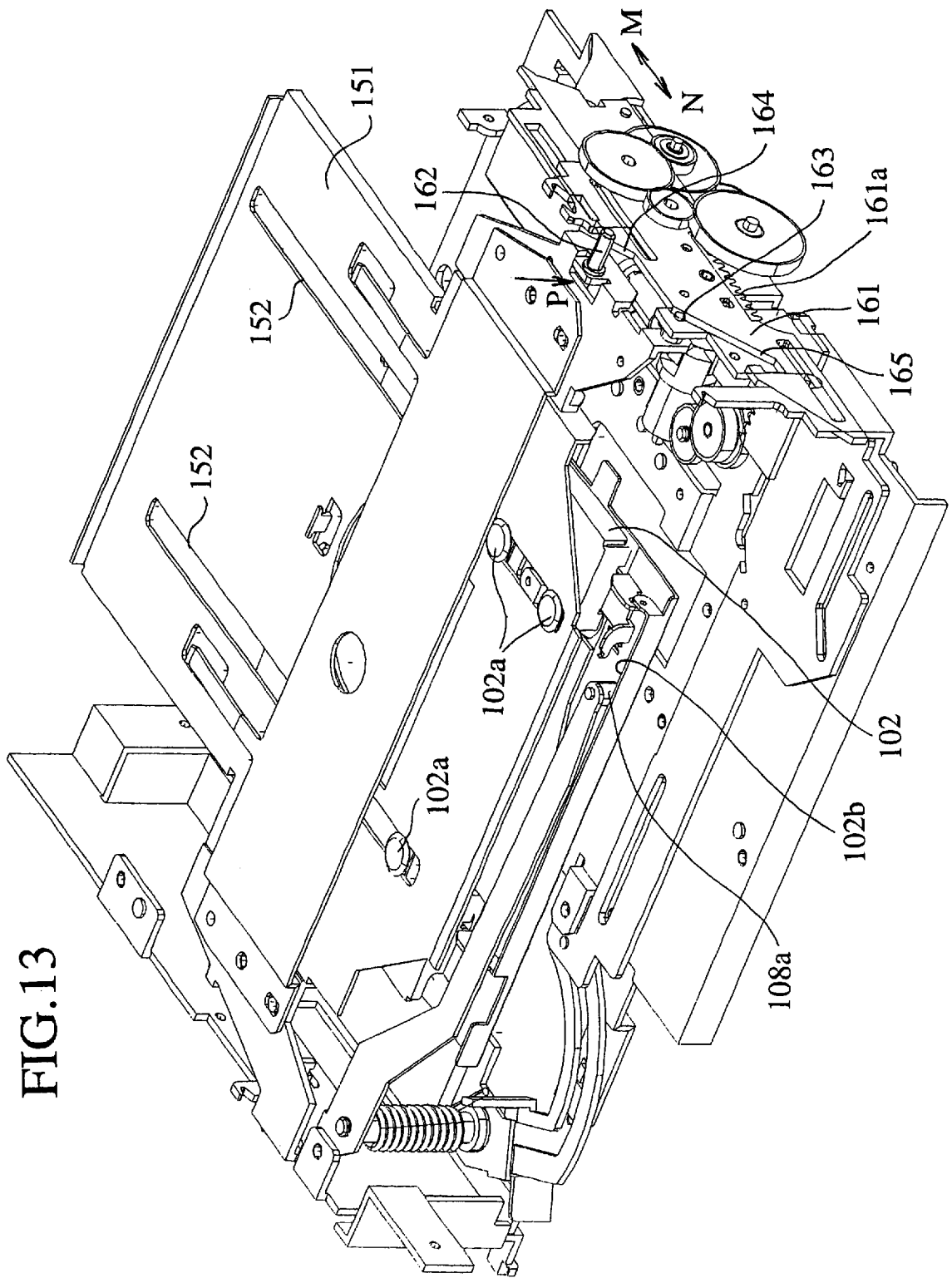
FIG. 13 is a three-dimensional view of an MD holder guided by an MD holder guide to a fixed position in the device as seen from a drive plate in a disk device according to a first embodiment of the present invention.

FIG. 13 is a three-dimensional view of an MD holder 102 guided by a guide slit formed on an MD holder guide to a fixed position in the device as seen from a drive plate 101 in a disk device according to a first embodiment of the present invention. In FIG. 13, 161 is a moveable plate which is driven in direction N and M by the motor 110. As a result, a rack 161a is formed on the moveable plate 161 which meshes with the gear wheel which is rotated by the motor 110. 162 and 163 are pins on the MD holder 102 side. First and second inclined sections 164, 165 are formed on the moveable plate 161. The first inclined section 164 engages with the pin 162 and the second inclined section 165 engages with the pin 163.

When the moveable plate 161 is driven in direction M by the motor 110, the pin 162 which is integrated on the MD holder 102 slides down the first inclined section 164 of the moveable plate 161 and the pin 163 which is integrated on the MD holder 102 slides down the second inclined section 165. The MD holder 102 housing the MD 107 is lowered in the direction P of the arrow in a horizontal state and an MD 107 housed in the MD holder 102 is mounted on the turntable 131 horizontally.

The operation of the invention will be described below.

Firstly the operation performed when an MD 107 is inserted from the insertion mouth and is housed in a fixed position in the MD holder 102 will be described.

Figure 14:
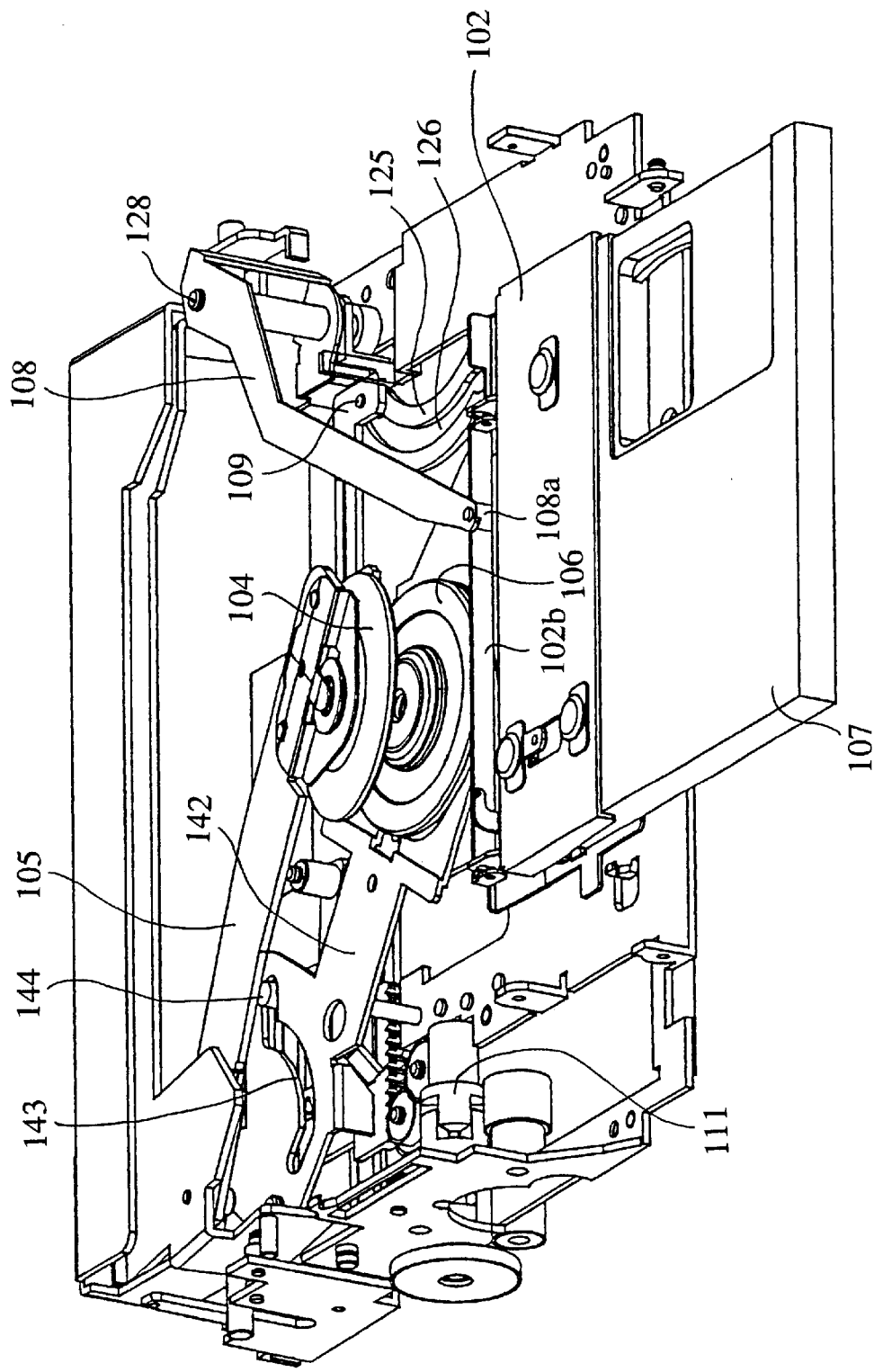
FIG. 14 is an explanatory view of an MD being housed in a fixed position in the MD holder in a disk device according to a first embodiment of the present invention.

FIGS. 14, 15 and 16 show the disk device with the MD 107 housed in a fixed position in the MD holder 102.

The disk device of the present invention can be used with both CDs and MDs. When used with an MD, a user inserts an MD 107 to be used from an insertion mouth (not shown). The MD 107 is inserted to be housed in an MD holder 102.

The position of the MD holder 102, CD clamp 104 and CD adapter 106 are as shown in FIG. 14 when an MD 107 is housed in a fixed position after being inserted from an insertion mouth. As shown in FIG. 5, the switch operation piece 127 abuts with the actuator of the MD insertion detection switch 141, the user inserts an MD 107 from the insertion mouth, which is housed in a fixed position of the MD holder 102. By this process, the insertion of the MD 107 is not detected.

Figure 17:
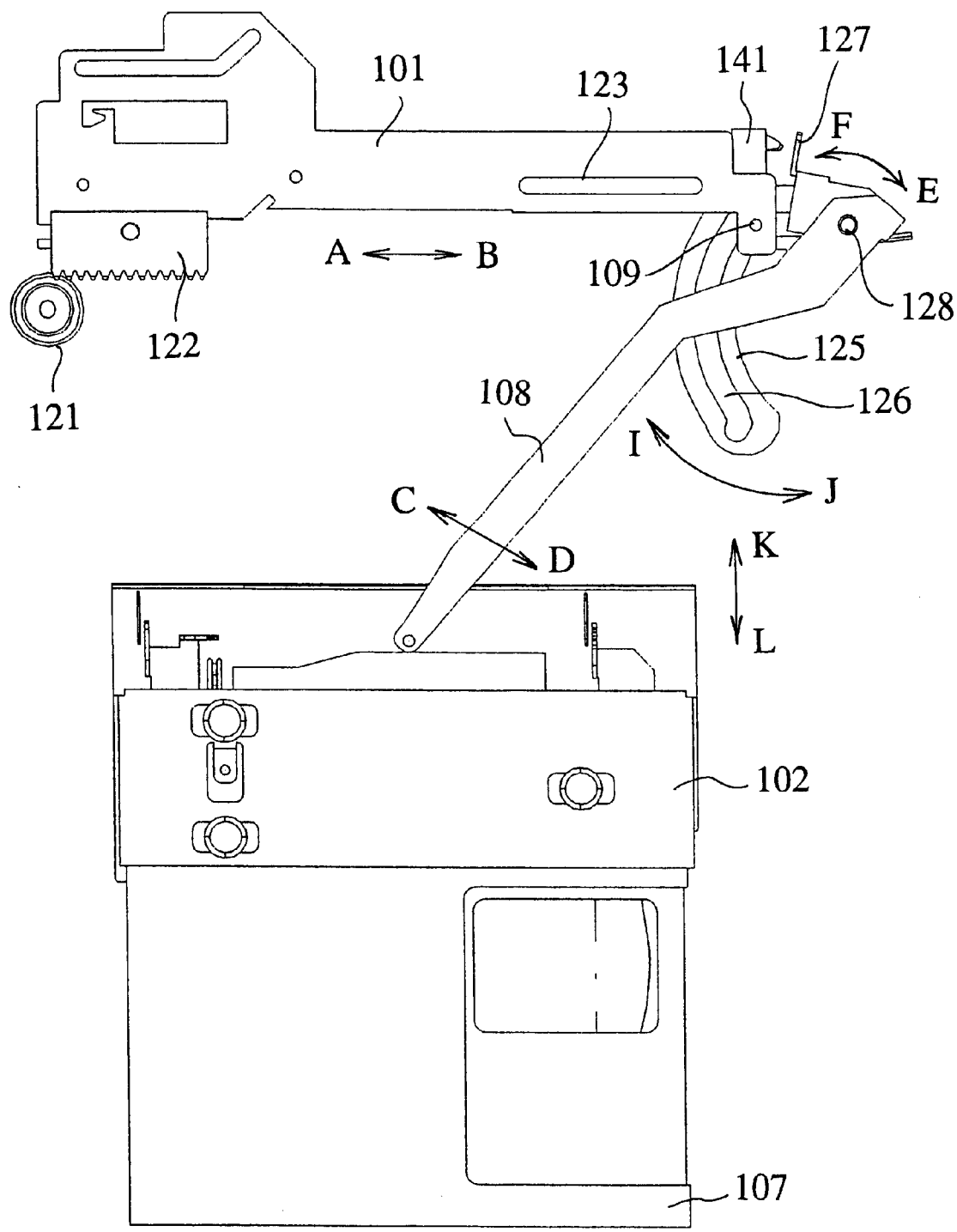
FIG. 17 is an explanatory view of the insertion of an MD being detected and a drive plate displacing in the direction A of the arrow as a result in a disk device according to a first embodiment of the present invention.
Figure 18:
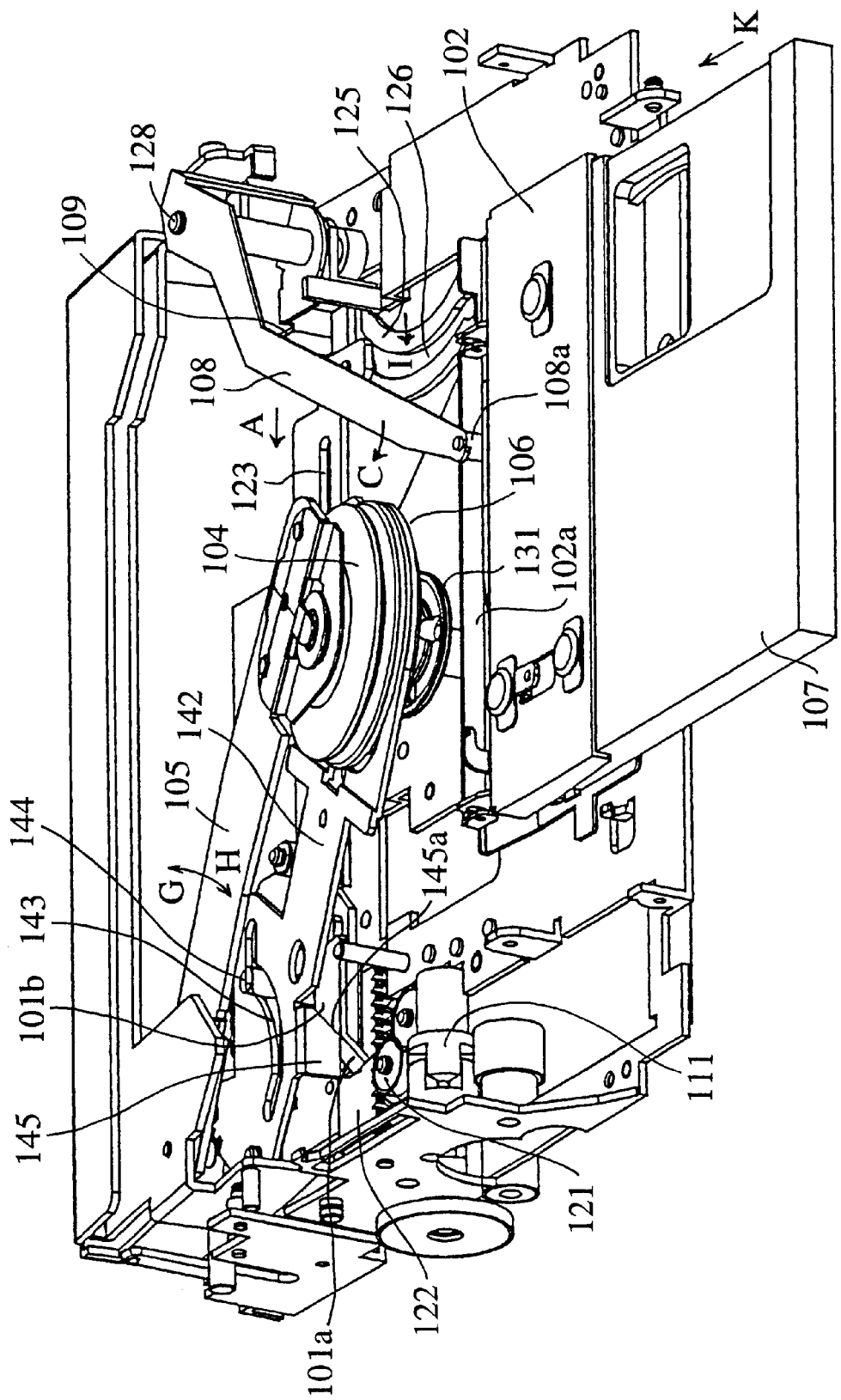
FIG. 18 is an explanatory view of the insertion of an MD being detected, a drive plate displacing in the direction A of the arrow as a result and a CD adapter arm being raised upwardly in a disk device according to a first embodiment of the present invention.
Figure 19:
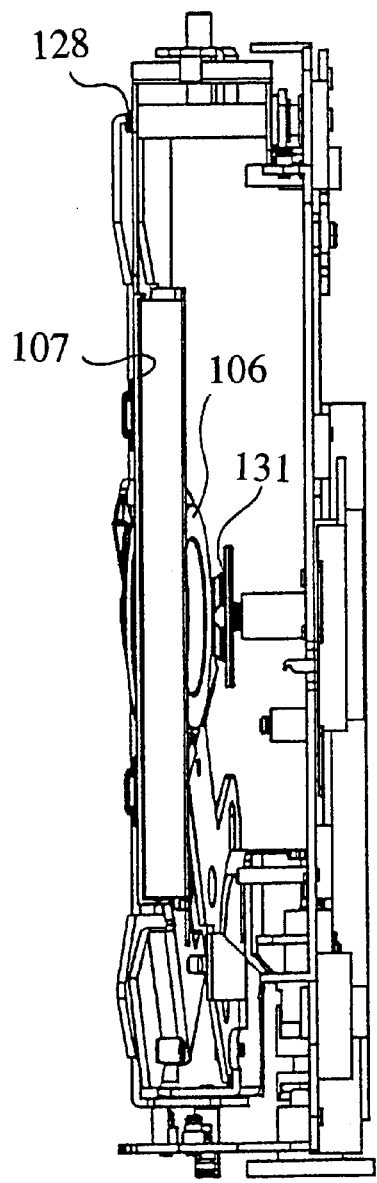
FIG. 19 is an explanatory view of the insertion of an MD being detected, a drive plate displacing in the direction A of the arrow as a result and a CD adapter arm being raised upwardly in a disk device according to a first embodiment of the present invention.
Figure 20:
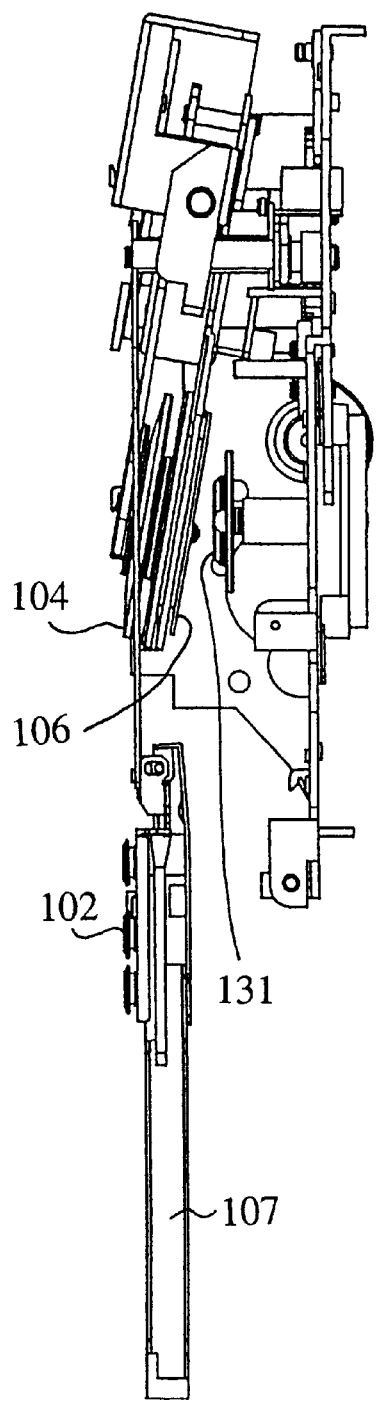
FIG. 20 is an explanatory view of the insertion of an MD being detected, a drive plate displacing in the direction A of the arrow as a result and a CD adapter aim being raised upwardly in a disk device according to a first embodiment of the present invention.

When the user inserts the MD 107 further, the MD 107 is inserted into a fixed position in the MD holder 102 and the user pushes the MD 107 from this position into the device, the MD holder feed arm 108 is rotated in direction C by the pushing operation and, as shown in FIG. 17, the switch operation piece 127 is rotated in direction E.

As a result, the switch operation piece 127 does not abut with the actuator of the MD insertion detection switch 141, the MD insertion detection switch is switched as a result and the insertion of the MD is detected.

Now the operation of the invention will be described when the insertion of an MD is detected and the drive plate 101 is displaced in the direction A as a result.

FIGS. 17, 18, 19 and 20 show the disk device when the insertion of an MD is detected and the drive plate 101 is displaced in direction A.

When the insertion of an MD 107 is detected by the MD insertion switch 141 as shown in FIG. 17 and the drive plate 101 displaces in direction A, as shown in FIGS. 17, 18, 19 and 20, the CD adapter 106 disposed on the turntable 131 is raised upwardly and the CD adapter 106 overlaps with the rear face of the CD clamp 104 from below the CD clamp 104. This is due to the edge 145a of the projection 145 formed on the base of the CD adapter arm 142 sliding the inclined step 101a upwardly to the upper step 101b.

When the drive plate 101 displaces in direction A, the pin 109 formed on the drive plate 101 displaces into the slit 126 and the slit member 125 is rotated about the shaft 128 in direction I as shown in FIG. 17. Since the MD holder feed arm 108 is rotatably integrated with the slit member 125, it is rotated in direction C in the same way as the slit member 125, the MD holder 102 housing the MD 107 is displaced in direction K and the MD 107 is drawn into the device.

The pin 144 formed on the drive plate 101 displaces into the slit 143 formed on the base of the CD adapter arm 142 and as a result, displaces the CD adapter arm 142,which displaced upwardly with the CD clamp arm 105, in direction G and refuges it into the device.

Next the operation of refuging the CD clamp 105 and the CD adapter arm 142 into the device will be described.

Figure 21:
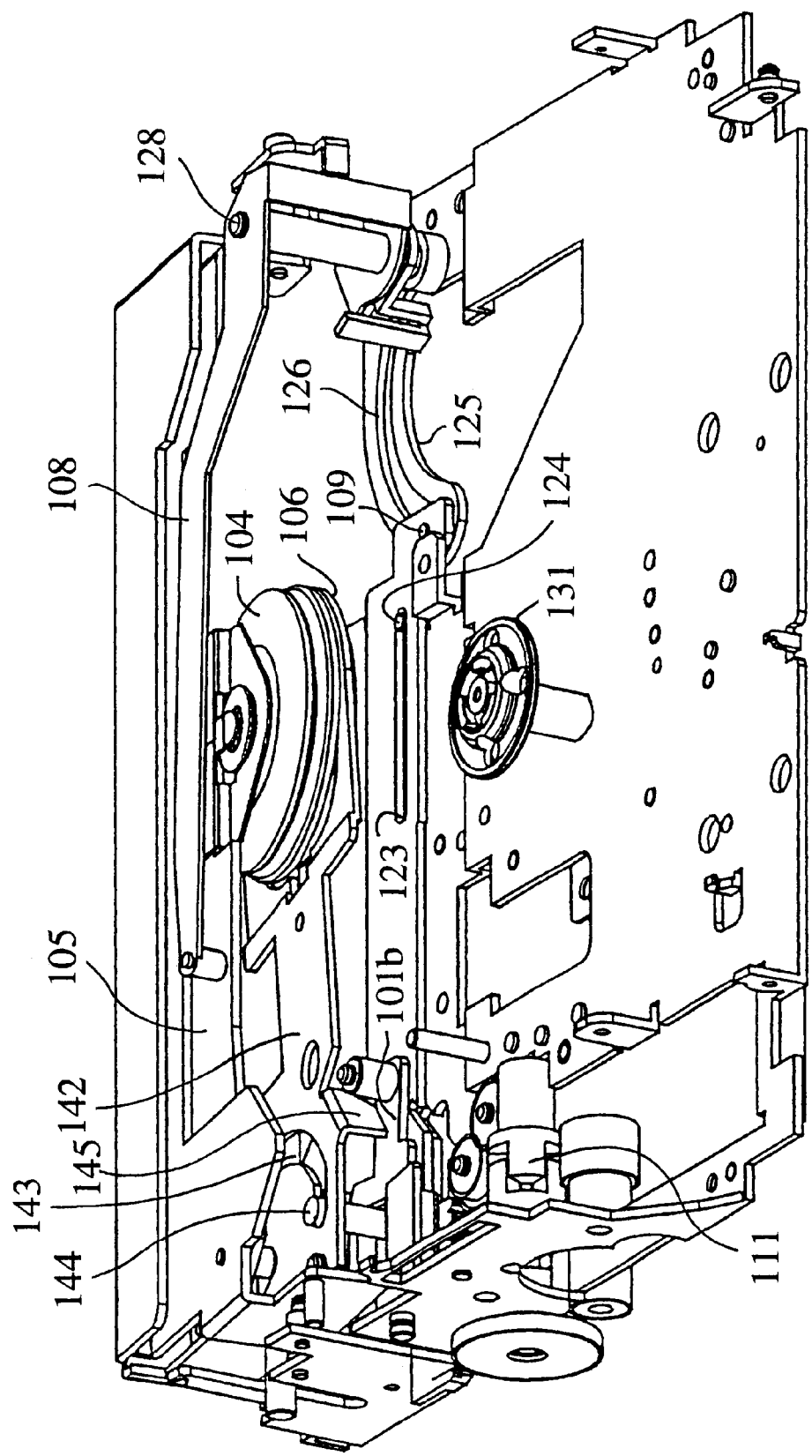
FIG. 21 is an explanatory view of a CD adapter arm and a CD clamp arm being refuged into the device in a disk device according to a first embodiment of the present invention.
Figure 22:
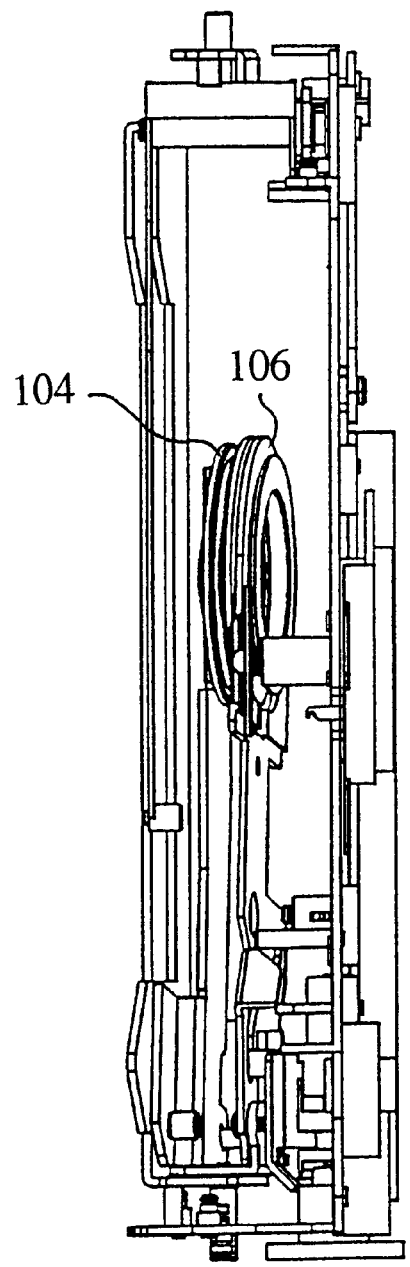
FIG. 22 is an explanatory view of a CD adapter arm and a CD clamp arm being refuged into the device in a disk device according to a first embodiment of the present invention.
Figure 23:
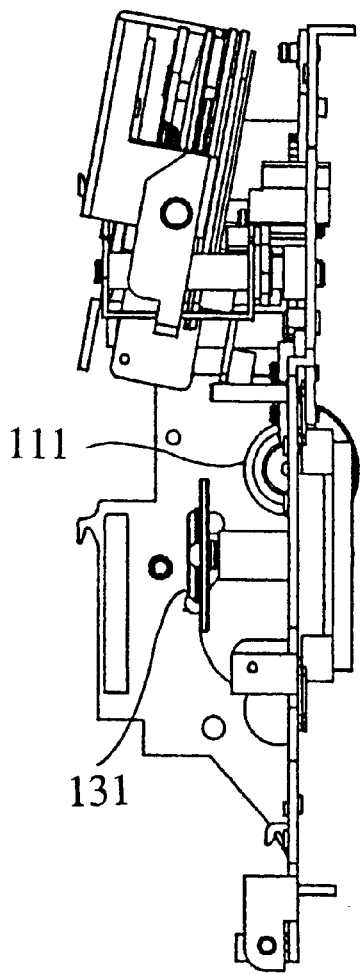
FIG. 23 is an explanatory view of a CD adapter arm and a CD clamp arm being refuged into the device in a disk device according to a first embodiment of the present invention.

FIGS. 21, 22 and 23 are explanatory views of a CD adapter arm 142 and a CD clamp arm 105 being refuged into the device in a disk device according to a first embodiment of the present invention.

In this state, the pin 109 formed on the drive plate 101 displaces towards the end of the slip 126 as shown in FIG. 21. The pin 124 displaces to the right-side end of the guide slit 123 while the pin 144 displaces to the left-side end of the guide slit 143.

Figure 24:
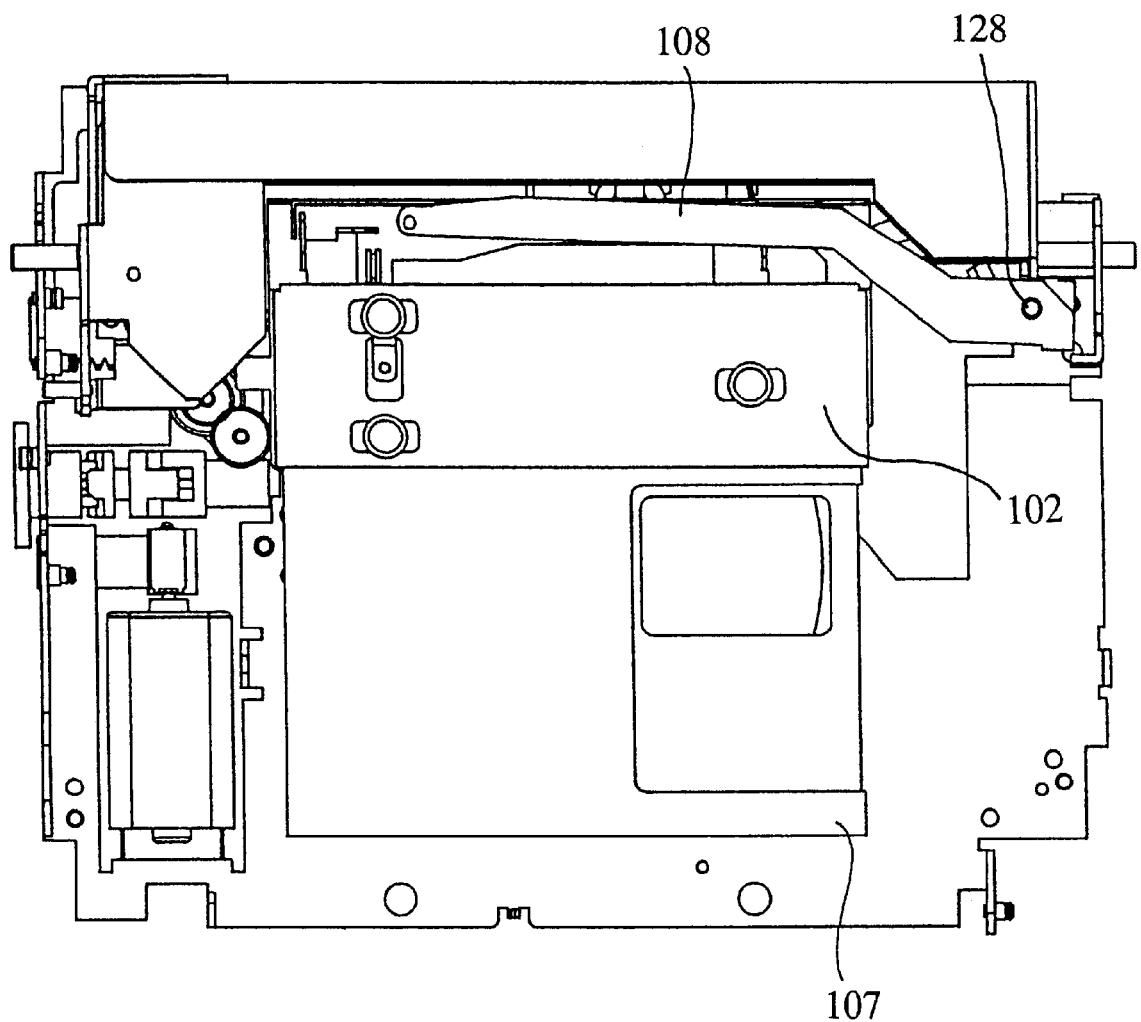
FIG. 24 is an explanatory view of an MD being set to a fixed position in the device according to a disk device according to a first embodiment of the present invention.
Figure 25:
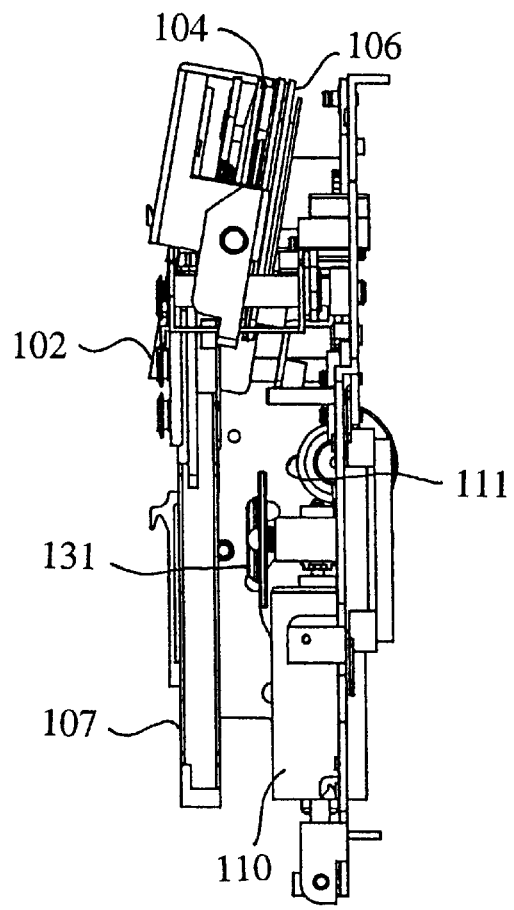
FIG. 25 is an explanatory view of the right side of FIG. 24.
Figure 26:
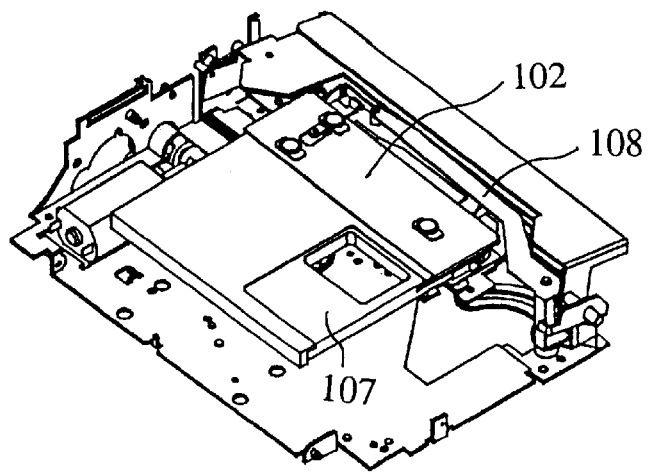
FIG. 26 is a three-dimensional explanatory view of of FIG. 24 and FIG. 25.

FIGS. 24, 25, 26 and 27 are explanatory views of an MD 107 housed in an MD holder 102 when a CD adapter arm 142 and a CD clamp arm 105 are refuged into the device according to a disk device according to a first embodiment of the present invention. FIG. 24 is an explanatory view of an MD 107 being set to a fixed position in the device, FIG. 25 is an explanatory view of the light side of FIG. 24 and FIG. 26 is a three-dimensional explanatory view of FIG. 24 and FIG. 25.

Figure 27:
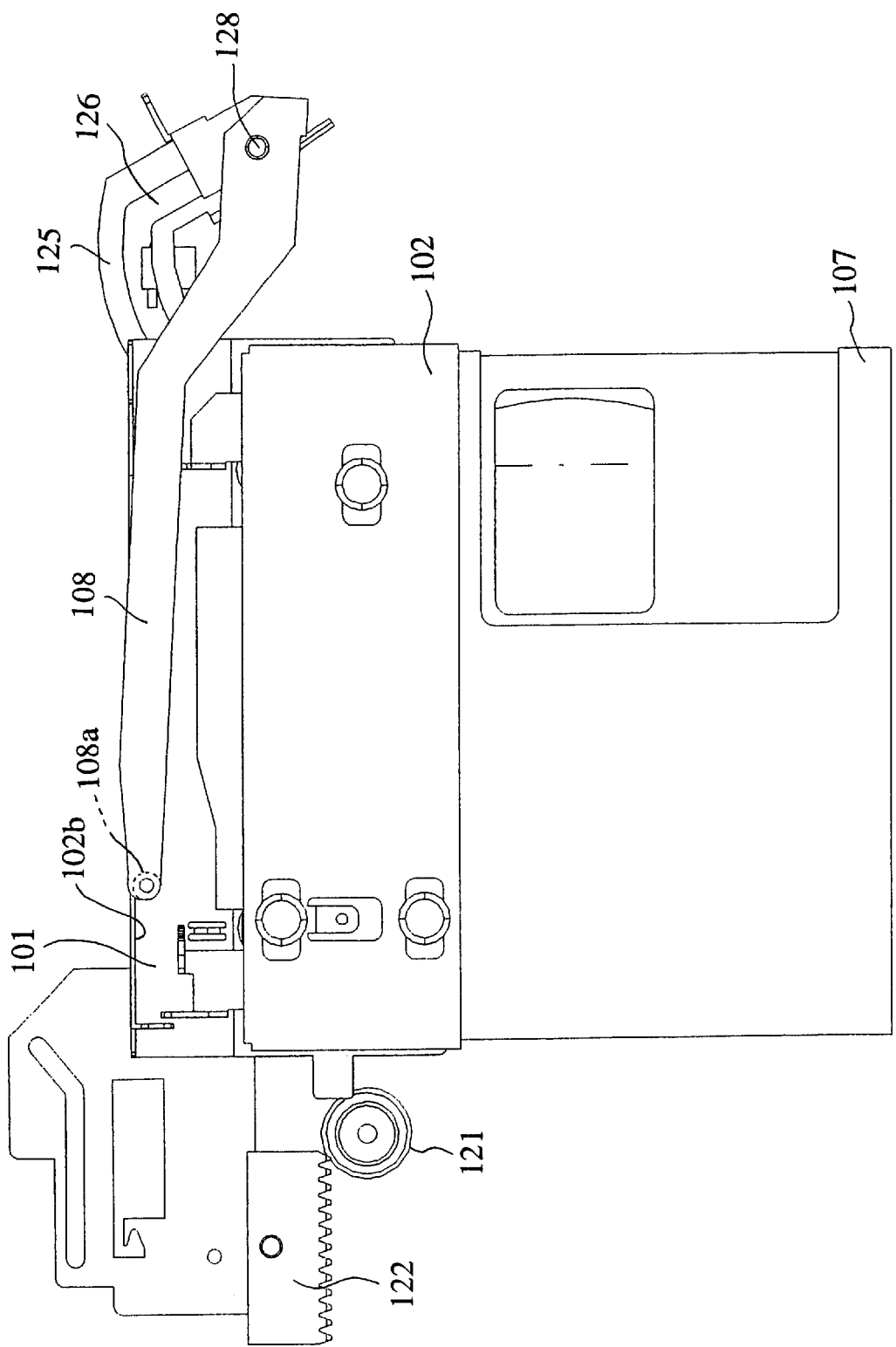
FIG. 27 is an explanatory view of the relationship of the drive plate and the MD housed in the MD holder in a disk device according to a first embodiment of the present invention.
Figure 28:
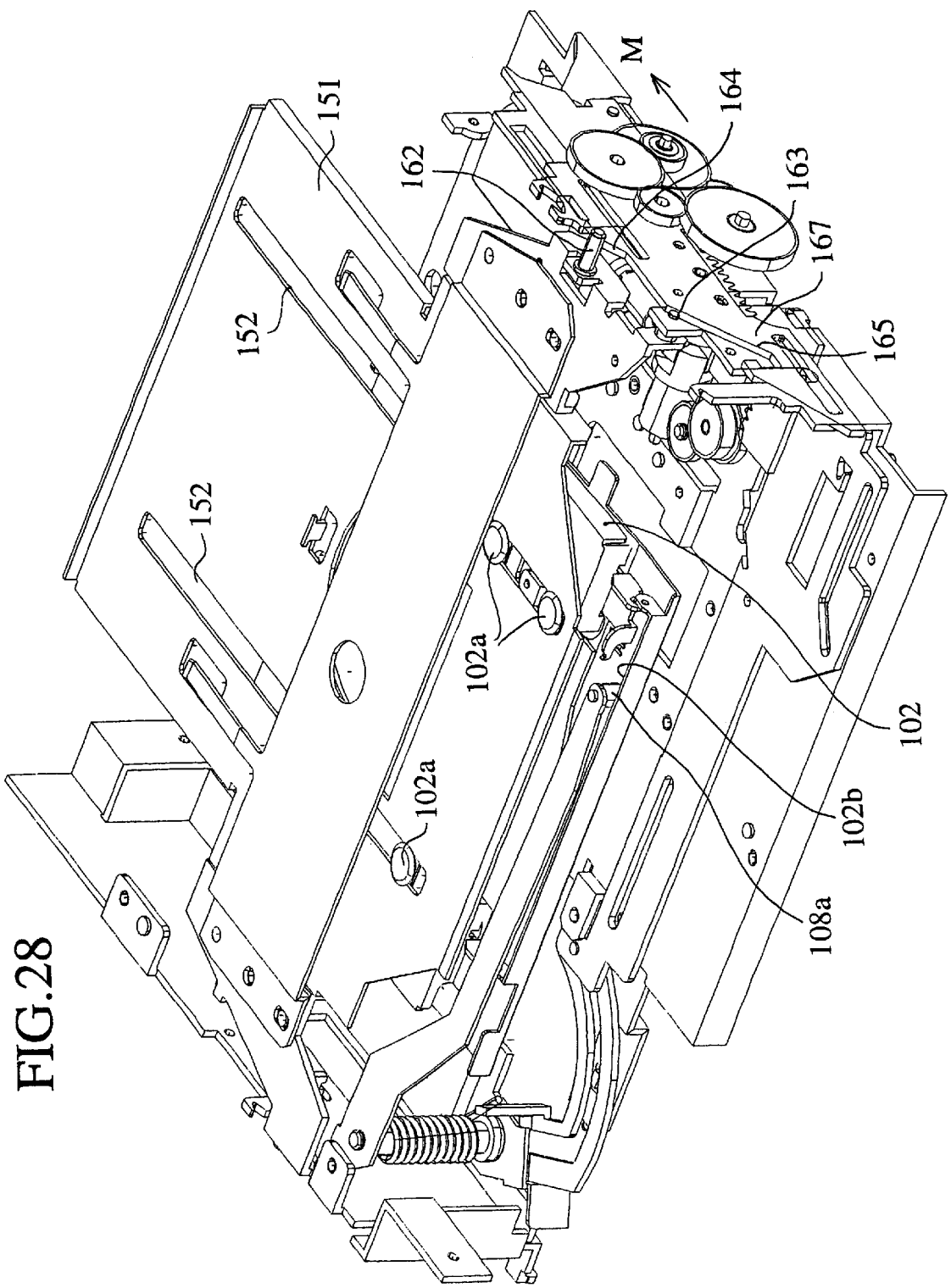
FIG. 28 is an explanatory view of an MD holder guide and an MD holder guided in a fixed position in the device as seen from the drive plate side in a disk device according to a first embodiment of the present invention.

FIG. 27 shows the relationship of the drive plate 101 and the MD 107 housed in the MD holder 102 in a disk device. FIG. 28 is an explanatory view of an MD holder 102 guided in a fixed position in the device by an MD holder guide 151 and a guide slit 152 of the MD holder guide 151 as seen from the drive plate 101 side. In the figures, the central rotational center of the MD 107 set in a fixed position in the device is disposed exactly horizontally on the turntable 131.

The MD 107 is set to he drawn to a fixed position in the device as the pin 102a formed on the MD holder 102 is guided by the guide slit 152 formed on the MD holder guide 151.

In this state, the moveable plate 161 is driven by the motor 110 in direction M and the pin 162 integrated with the MD holder 102 slides down the first inclined face 164 of the moveable plate 161 and the pin 163 integrated with the MD holder 102 slides down the second inclined face 165 of the moveable plate 161. As a result, the MD holder 102 is lowered in direction P in a horizontal state storing the MD 107 and the rotational center of the MD 107 stored in the MD holder 102 is mounted on the turntable 131. Thus the recording medium disk of the MD 107 can be driven by the turntable 131.

As shown above, according to embodiment 1 of the present invention, the setting operation of an MD 107 stored in an MD holder 102 to a fixed position in the device and the refuge operation of the CD clamp 104 and CD adapter 106 are realized by the displacement of the drive plate 101 in direction A, a disk device is provided for common use with CDs and MDs which has a simplified structure and improved reliability.

INDUSTRIAL APPLICATION

As shown above, the disk device of the present invention is adapted for common use with CDs used as single disks and MDs used as cartridge-stored disks.

What is claimed is:

1. A disk device capable of loading and ejecting case-stored recording medium disks and non case-stored recording medium disks, said case-stored and non case-stored recording medium disks being stored on and ejected from a turntable, said disk device capable of playing both said case-stored and non case-stored recording medium disks, said disk device comprising:

a coupled displacement member which displaces in a coupled manner;

a case-stored recording medium disk loading mechanism which loads said case-stored recording medium disks, fed to a fixed position into said disk device by the coupled displacement member, onto said turntable;

a non case-stored disk loading mechanism which loads said non case-stored disks to a fixed position into said disk device, onto said turntable and which has a non case-stored recording medium disk clamp and a non case-stored recording medium disk adapter; and a refuge mechanism which refuges said non case-stored recording medium disk loading mechanism into said disk device, to a position which does not interfere with the loading of said case-stored recording medium disks onto said turntable, by the displacement of the coupled displacement member when said case-stored recording medium loading mechanism feeds said case-stored recording medium disk to a fixed position in said device and loads said disk onto said turntable.

2. The disk device according to claim 1, wherein said disk device further comprises:

a cam mechanism which raises said non case-stored recording medium disk adapter upwardly by the coupled displacement of said coupled displacement mechanism when said case-stored recording medium disk loading mechanism loads said case-stored recording medium disk to a fixed position onto the turntable.

3. The disk device according to claim 1, wherein said case-stored recording medium disk loading mechanism further comprises:

a case-stored recording medium disk feed member which performs a rotating operation due to the coupled displacement of the coupled displacement member; and an operation conversion mechanism which changes a rotation operation of the case-stored recording medium disk feed member into a coupled operation of the case-stored recording medium disk holder which houses said case-stored recording medium disk in order to perform coupled feeding of said case-stored recording medium disk to a fixed position in the device.

4. The disk device according to claim 3, wherein said case-stored recording medium disk feed member further comprises:

a disk holder arm, one end of which is engaged to slide with a section of said case-stored recording medium disk holder and forms a section of said operation conversion mechanism and the other end of which is rotatably supported; and a guide slit member which integrally rotates with said disk holder arm and forms a curved guide slit, wherein said coupled displacement member is provided with a pin which is engaged with the curved guide slit and converts the coupled displacement of the coupled displacement member to a rotation operation of the case-stored recording medium disk feed member.

5. The disk device according to claim 3, wherein said refuge mechanism further comprises:

a guide slit formed in proximity to the base of said disk adapter arm on the tip of which said non case-stored recording medium disk adapter is rotatably formed, and a pin formed on said coupled displacement member, said pin refuging said non case-stored recording medium disk loading mechanism into said device by the coupled displacement of said coupled displacement member when said pin engages with said guide slit, said case-stored recording medium disk being loaded to a fixed position onto said turntable.

6. A method of loading and ejecting case-stored and non case-stored disks into and from a turntable in a disk device by the displacement of a coupled displacement member in a coupled manner, said method comprising the steps of:

loading said case-stored disk by a case-stored disk loading mechanism to a fixed position onto said turntable, said disk loading mechanism operatively functioning by the displacement of said coupled displacement member; and refuging a non case-stored disk loading mechanism, by the displacement of said coupled displacement member, into a position which does not interfere with loading onto said turntable said case-stored disk.

* * * * *